April 29, 1952 F. P. UPTON 2,594,600
SUNDIAL AND COMPASS
Filed Feb. 2, 1950
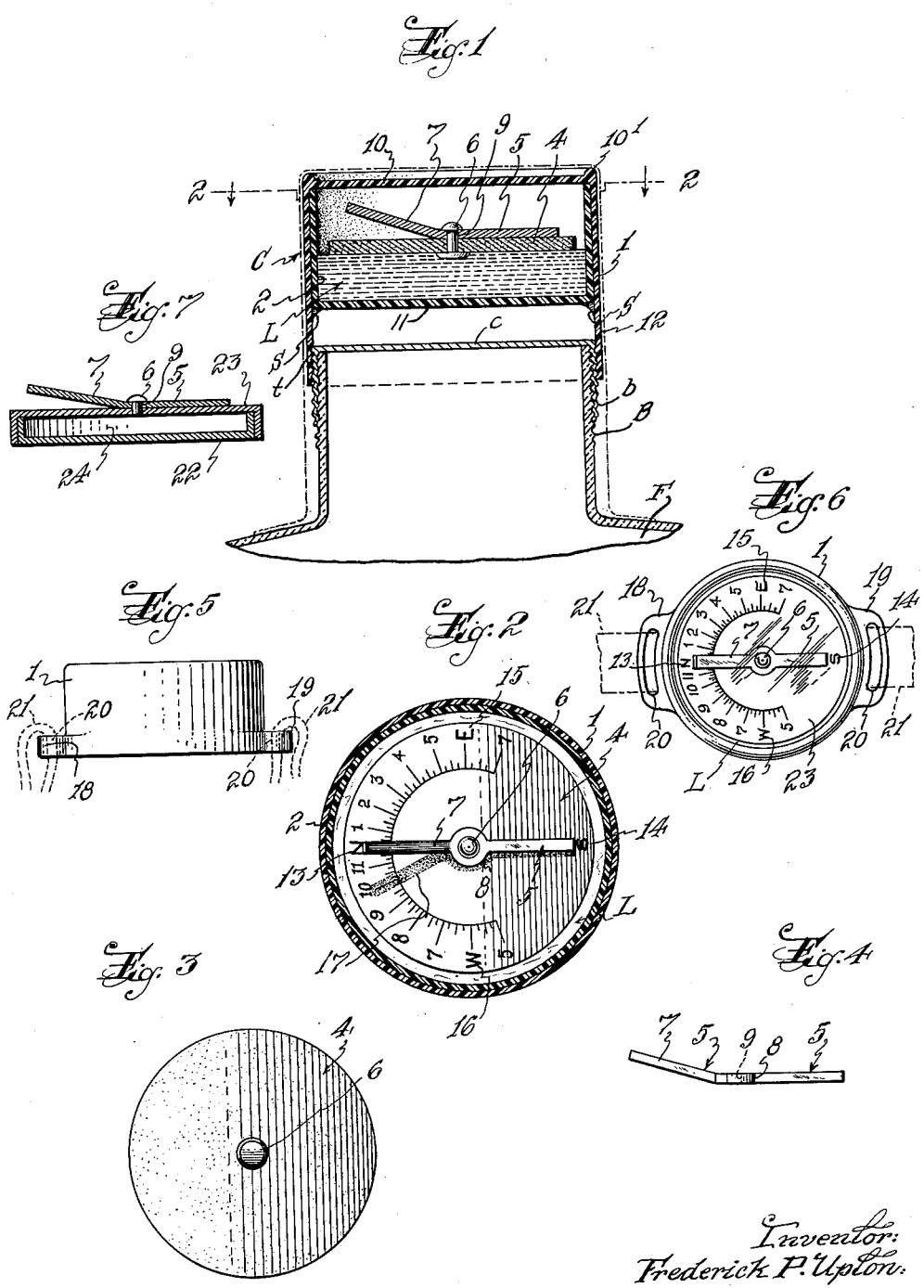
Inventor:
Frederick P. Upton.
BY
A. D. T. Libby
Attorney.

Patented Apr. 29, 1952

2,594,600

UNITED STATES PATENT OFFICE 2,594,600

SUNDIAL AND COMPASS

Frederick P. Upton, New Rochelle, N. Y., assignor to Berke Brothers Distilleries Inc., Boston, Mass.

Application February 2, 1950, Serial No. 141,876

6 Claims. (Cl. 33—62)

This invention relates to the construction of a sundial and compass device, which can be made so as to be used in various ways.

The principal object of my invention is to provide a sundial and compass that can be constructed very cheaply yet one that will be efficient in its operation. A further object is to provide a device that can be utilized in connection with various objects or worn by a user. Certain of the forms which the invention may take are shown in the drawing in which, Figure 1 is a sectional view through one form of the device as applied to the top of a bottle;

Figure 2 is a view on the line 2—2 of Figure 1;

Figure 3 is a bottom view of the float shown in Figure 1;

Figure 4 is a side view of the magnet used with the float shown in Figures 1 and 2;

Figure 5 is a side elevation of a modified form of the device;

Figure 6 is a plan view looking down on Figure 5;

Figure 7 shows a modified form of a float which may be used in the form of the device as shown in Figures 1 and 5.

In the various figures, wherein like numbers refer to corresponding parts, 1 is a cup-shaped member having an extended flange portion 12 with threads t formed on its inner surface to engage the threads b on a cap c fitting on the threads B of bottle F. Closely positioned within the member 1 is a cup-shaped member 2 which fits closely within the member 1, the top part of which is closed by a bottom member 10, which preferably has a circular rim 10' to receive a protecting cap C which is adapted to fit over the sundial and compass device, bottle cap and the neck and cap P of the bottle F. The cup 2 has an integral bottom 11 and is adapted to carry a liquid L of any suitable fluid preferably of the kind that will not freeze of which there are many available. Carried by the liquid L is a float 4 of any suitable material such as cork or wood both treated to prevent any absorption of the liquid L. Attached to the float 4 is a small magnet 5 having an enlarged portion 8 with a hole 9 therein to receive a rivet 6 holding the magnet 5 to the float 4. One end 7 of the magnet is bent upwardly as shown in Figures 1 and 4, for the purpose of casting a shadow 17 as illustrated in Figure 2. The float 4 has molded therein or preferably stamped thereon, the points of the compass, N, S, E, and W, numbered 13; 14; 15; and 16. The float dial has the hours indicated one to seven for the afternoon, and five to eleven for before noon. While it has been stated that these markings may be molded into the float 4 or stamped thereon, they may be applied to separate sheets of suitable material and mounted on the float 4 at the same time that the magnet is fastened in position. In Figures 5 and 6 the outer casing member 1 may have outwardly extending ears 18 and 19 with slots 20 therein to receive the ends of the strap 21 so that the device may be attached to the wrist of a user otherwise the construction may be the same as shown in Figures 1 and 2. In Figure 7 is shown a modified form of the float made up of two cup-shaped members 22 and 23 which have a tight push fit so as to provide a closed chamber 24 that will retain and hold air whereby the float will act the same as the float in Figure 1, it being understood that the parts 22 and 23 are made up of light plastic material. As shown in Figure 1 the holding means S in the form of suitable plastic material may be utilized to securely hold the two cup-shaped members in position.

It will be obvious from what has been said and especially with respect to Figure 2 that the magnet 5 when in position so that the end 7 when in position to point north, a shadow will be cast on the dial, as indicated at 17. However, it is to be understood that the user will make records to take care of the variations of the shadows 17 at different seasons of the year or for different localities with respect to the seasonal position of the sun.

Since a magnet 5 is used in this device, the casing formed by the cups 1 and 2 should be of non-magnetic material with the bottom 10 of the cup 1 being preferably transparent so that the dial and directions numbered on the float may be readily seen through the part 10. There are several types of plastic material which may be utilized for making the chamber of the device, one such as "styrene" which I have utilized, and it will be readily understood that certain of the details may be changed in the construction without departing from the spirit of my invention and the scope of the appended claims.

Having thus described my invention what I claim is:

1. A sundial and compass device comprising a closed chamber of non-magnetic material, a suitable fluid carried within the chamber, a float having time and compass readings on its upper surface and visible from the top of the device on the fluid and a small magnet attached to and carried by the float also on its upper surface, said magnet having one end bent upwardly so as to cast a time indicating shadow as it turns.

2. A sundial and compass comprising a closed chamber of non-magnetic material, a suitable fluid carried within the lower part of the chamber, a float having time and compass readings on its upper surface which are visible from the top of the device, carried on the fluid and a narrow magnet fastened to the float and extending across it on the greater part of a diameter, said magnet having its end which points towards the N reading on the float, bent upwardly away from the float for the purpose described.

3. A sundial and compass as defined in claim 2 further characterized in that the float is made of only two interlocking parts of non-magnetic material to form a closed air chamber on the upper surface of which is mounted the said magnet.

4. A sundial and compass device comprising a closed chamber of suitable non-magnetic material the upper surface of which is preferably clearly transparent, a fluid carried within the chamber, and being preferably of the kind that will not readily freeze, a float within the chamber having time and compass reading thereon that are visible from the top of the device and a magnet positioned on a diameter of the float with at least the north pole end bent upwardly away from the top surface of the float.

5. A sundial and compass device as set forth in claim 4 further characterized in that the chamber is made of two telescopic cup-shaped parts the outer of which has an extending circular rim with inner formations therein for attaching the device to a bottle top.

6. A sundial and compass device as set forth in claim 4 further characterized in that the chamber is made of two telescopic cup-shaped parts the outer of which has a pair of oppositely positioned ears to receive strap means for holding the device onto a person's wrist.

FREDERICK P. UPTON.

REFERENCES CITED

The following references are of record in the file of this patent:

UNITED STATES PATENTS

| Number | Name | Date |
|---|---|---|
| 1,294,710 | Roland | Feb. 18, 1919 |
| 1,474,394 | Warburg | Nov. 20, 1923 |
| 2,463,781 | Lawrence | Mar. 8, 1949 |

FOREIGN PATENTS

| Number | Country | Date |
|---|---|---|
| 450,989 | Great Britain | July 28, 1936 |
| 582,691 | Great Britain | Nov. 25, 1946 |